(12) United States Patent
Dannhauer et al.

(10) Patent No.: US 8,402,836 B2
(45) Date of Patent: Mar. 26, 2013

(54) PRESSURE DIFFERENCE MEASURING CELL

(75) Inventors: Wolfgang Dannhauer, Sandersdorf (DE); Michael Philipps, Lorrach (DE); Friedrich Schwabe, Kleinmachnow (DE); Dieter Stolze, Potsdam (DE); Anh Tuan Tham, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 335 days.

(21) Appl. No.: 12/735,098

(22) PCT Filed: Dec. 12, 2008

(86) PCT No.: PCT/EP2008/067369
§ 371 (c)(1),
(2), (4) Date: Jun. 16, 2010

(87) PCT Pub. No.: WO2009/077433
PCT Pub. Date: Jun. 25, 2009

(65) Prior Publication Data
US 2010/0281992 A1    Nov. 11, 2010

(30) Foreign Application Priority Data

Dec. 17, 2007 (DE) .......................... 10 2007 061 184

(51) Int. Cl.
*G01L 13/02* (2006.01)
(52) U.S. Cl. ........................................... 73/716; 73/736
(58) Field of Classification Search .......................... None
See application file for complete search history.

(56) References Cited

U.S. PATENT DOCUMENTS

| | | | |
|---|---|---|---|
| 4,668,889 A | 5/1987 | Adams | |
| 5,992,240 A | 11/1999 | Tsuruoka | |
| 7,188,528 B2 | 3/2007 | Kurtz | |
| 2005/0087020 A1* | 4/2005 | Ueyanagi et al. | 73/753 |
| 2005/0115326 A1* | 6/2005 | Dannhauer et al. | 73/716 |
| 2005/0235753 A1 | 10/2005 | Kurtz | |
| 2007/0227252 A1* | 10/2007 | Leitko et al. | 73/717 |
| 2007/0289386 A1* | 12/2007 | Burczyk et al. | 73/717 |
| 2011/0203380 A1* | 8/2011 | Philipps | 73/716 |

FOREIGN PATENT DOCUMENTS

| | | |
|---|---|---|
| CN | 85101132 | 1/1987 |
| DE | 100 32 579 A1 | 1/2002 |
| DE | 101 38 759 A1 | 3/2003 |
| DE | 10 2004 033 813 A1 | 2/2006 |
| DE | 10 2005 020 282 A1 | 11/2006 |
| DE | 10 2005 036 955 A1 | 2/2007 |

(Continued)

*Primary Examiner* — Andre Allen
(74) *Attorney, Agent, or Firm* — Bacon & Thomas, PLLC

(57) ABSTRACT

A pressure difference measuring cell for registering pressure difference between a first pressure and a second pressure, comprises: an elastic measuring arrangement having at least one measuring membrane, or diaphragm, that comprises silicon; a platform, which is pressure-tightly connected with the elastic measuring arrangement; a first hydraulic path for transferring a first pressure onto a first surface section of the elastic measuring arrangement; and a second hydraulic path for transferring a second pressure onto a second surface section of the elastic measuring arrangement. The first pressure opposes the second pressure, and the elastic deflection of the measuring arrangement is a measure for the difference between the first and the second pressure, wherein the pressure difference measuring cell has additionally at least one hydraulic throttle, characterized in that the at least one hydraulic throttle comprises porous silicon.

11 Claims, 3 Drawing Sheets

FOREIGN PATENT DOCUMENTS

| | | |
|---|---|---|
| EP | 1 010 973 B1 | 6/2000 |
| JP | 08094474 A | 4/1996 |
| WO | WO 85/02676 | 6/1985 |
| WO | WO 2004/042338 A1 | 5/2004 |

\* cited by examiner

PRESSURE DIFFERENCE MEASURING CELL

TECHNICAL FIELD

The present invention concerns a pressure difference measuring cell for registering a pressure difference between a first pressure and a second pressure.

SUMMARY OF THE INVENTION

The pressure difference measuring cell of the invention for registering pressure difference between a first pressure and a second pressure comprises: an elastic measuring arrangement having at least one measuring membrane, or diaphragm, that comprises silicon; a platform, which is pressure-tightly connected with the elastic measuring arrangement; a first hydraulic path for transferring a first pressure onto a first surface section of the elastic measuring arrangement; a second hydraulic path for transferring a second pressure onto a second surface section of the elastic measuring arrangement, wherein the first pressure opposes the second pressure, and elastic deflection of the measuring arrangement is a measure for the difference between the first and the second pressure, wherein the pressure difference measuring cell additionally has at least one hydraulic throttle, characterized in that the at least one hydraulic throttle comprises porous silicon.

In a first embodiment of the invention, the elastic measuring arrangement includes a measuring membrane, or diaphragm, which is arranged between a first platform part and a second platform part, and is pressure-tightly connected with both platform parts, in each case, along an perimetral joint, and wherein the first and the second hydraulic paths comprise, in each case, at least one duct through one of the platform parts.

In a further development of this embodiment of the invention, the hydraulic throttle comprises a porous Si layer, which surrounds a duct opening on a platform surface facing away from measuring membrane, or diaphragm, and a hydraulically sealed cover layer, which covers the porous Si layer up to at least one intake opening, which is laterally spaced from the duct opening, so that the hydraulic path extends from at least one intake opening through the porous Si layer in the plane of the porous Si layer to the duct opening.

In such case, the first platform part and the second platform part can have, in each case, on their surfaces facing away from the measuring membrane, or diaphragm, a hydraulic throttle with a porous Si layer and a cover layer, which, in each case, surrounds a duct opening.

In another further development of the first embodiment of the invention, the hydraulic throttle can be implemented, in that at least one duct through the platform has porous silicon.

In a second embodiment of the invention, the elastic measuring arrangement includes a first measuring membrane, or diaphragm, and a second measuring membrane, or diaphragm, wherein the first measuring membrane, or diaphragm, is pressure-tightly secured on a first surface section of the platform along an perimetral joint, the second measuring membrane, or diaphragm, is pressure-tightly secured on a second surface section of the platform along an perimetral joint, and wherein a third hydraulic path extends between the first and the second measuring membranes, or diaphragms, in order to couple the first and the second measuring membranes, or diaphragms, hydraulically, wherein the hydraulic throttle is arranged in the third hydraulic path.

In a further development of the second embodiment of the invention, the hydraulic throttle includes a layer of porous silicon, wherein the third hydraulic path extends through the porous Si layer of the plane of the Si layer.

Provided the hydraulic throttle is to be implemented by a porous layer, the porous Si layer has, for example, a thickness of no more than 20 micrometers, and preferably no more than 10 micrometers. The porous Si layer has furthermore a thickness of, for example, not less than 2 micrometers, preferably not less than 4 micrometers.

In a currently preferred embodiment of the invention, the pore size of the porous silicon amounts to, for example, no more than 100 nanometers, and preferably amounts to no more than 50 nanometers. On the other hand, it is currently preferred that the pore size amounts to not less than 10 nanometers, preferably not less than 20 nanometers.

In currently considered embodiments of the invention, the platform comprises silicon or glass.

In a further development of the invention, the pressure difference measuring cell also includes protection against unilateral static overloads. This is implemented in that a measuring membrane, or diaphragm, in the case of a unilateral overload, comes at least sectionally to rest on a platform and is supported by this.

In the case of pressure difference measuring cells with a measuring membrane, or diaphragm, between two platform parts, the two platform parts can be so embodied that they comprise, in each case, an overload protection against unilateral static overloads.

Equally in the case of that embodiment of the invention, in the case of which the elastic measuring arrangement includes a first measuring membrane, or diaphragm, and a second measuring membrane, or diaphragm, wherein the first measuring membrane, or diaphragm, is pressure-tightly secured on a first surface section of the platform along an perimetral joint, and the second measuring membrane, or diaphragm, is pressure-tightly secured on a second surface section of the platform along an perimetral joint, and wherein a third hydraulic path extends between the first and the second measuring membranes, or diaphragms in order to couple the first and the second measuring membranes, or diaphragms hydraulically, wherein the hydraulic throttle is arranged in the third hydraulic path, the first surface section and the second surface sections can be so embodied that, in the case of a unilateral static overload which acts on the first or second measuring membrane, or diaphragm, the measuring membrane, or diaphragm, which is on the respective surface and is affected by the overload comes at least sectionally to rest and is supported by the surface.

BRIEF DESCRIPTION OF THE DRAWINGS

The invention will now be explained on the basis of examples of embodiments illustrated in the drawing, the figures of which show as follows.

DETAILED DISCUSSION IN CONJUNCTION WITH THE DRAWINGS

Figure 1:
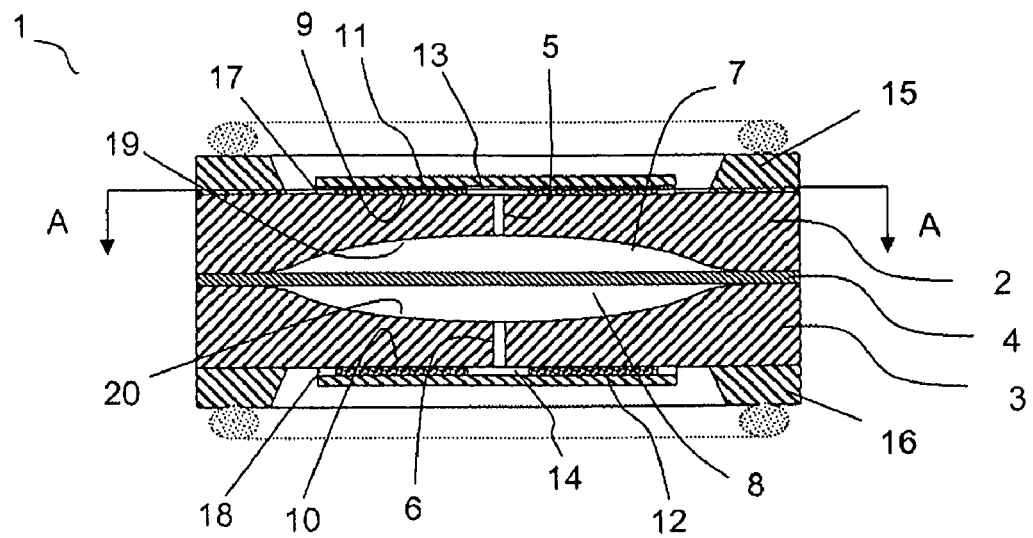
FIG. 1 is a longitudinal section through a first example of an embodiment of a pressure difference sensor of the invention.
Figure 2:
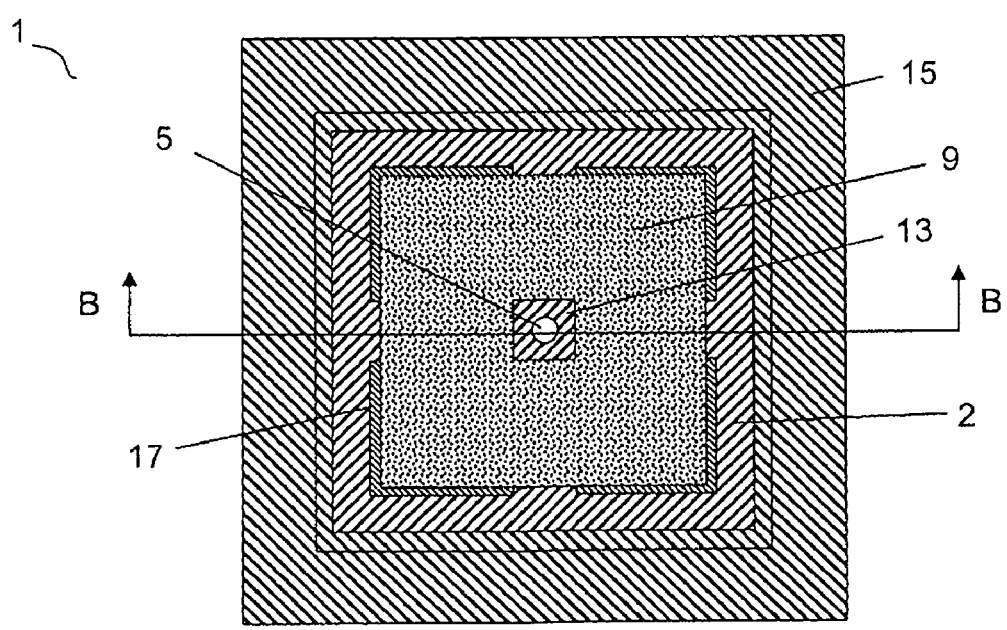
FIG. 2 is a plan view of the example of an embodiment of a pressure difference sensor of the invention of FIG. 1.

The pressure difference sensor of the invention 1 in FIGS. 1 and 2 includes a first platform part 2, a second platform part 3, and a measuring membrane, or diaphragm, 4, which is arranged between the two platform parts. The measuring membrane, or diaphragm, 2 preferably comprises a semiconductor material, especially silicon, while the first and the second platform part can comprise glass or a semiconductor material, wherein a semiconductor material, especially silicon, is currently preferred.

The measuring membrane, or diaphragm, 4 can be supplied with a first pressure on its first side through a first opening 5 through the first platform part 2. The first opening 5 opens into a first pressure chamber 7, which is formed between the first platform part 2 and the measuring membrane, or diaphragm, 4.

Furthermore, the measuring membrane, or diaphragm, 4 can be supplied with a second pressure on its second side, which lies opposite the first side, by a second opening 6 through the second platform part 3. The second opening 6 opens into a second pressure chamber 8, which is formed between the second platform part 3 and the measuring membrane, or diaphragm, 4, so that the second pressure opposes the first pressure and the resulting deflection of the measuring membrane, or diaphragm, 3 is a measure for the difference between the first pressure and the second pressure.

The first pressure and the second pressure are preferably transmitted to the pressure sensor, in each case, by means of a hydraulic path, which contains a transfer liquid. To accomplish this, the pressure sensor can be installed especially in a hydraulic measuring aid known to those skilled in the art, which has isolating diaphragms which terminate the hydraulic paths, and on which the pressures that are to be registered act.

The pressure sensor 1 furthermore includes a transducer (not illustrated here in greater detail), which transduces the deflection of the measuring membrane, or diaphragm, 4 into an electrical signal. The transducer can comprise a capacitive transducer, which evaluates, in each case, the capacitance between a platform side electrode and a measuring membrane, or diaphragm, side electrode, or a resistive transducer, for which the measuring membrane, or diaphragm, can comprise, for example, one or more piezoresistive bridge circuits or other bridge circuits with deformation dependent resistors.

According to the invention, the pressure sensor 1 is provided with an integrated overload protection, so that supplemental overload protection apparatuses can ideally be omitted in the hydraulic measuring aid. To explain the construction of the overload protection, FIG. 2 shows a plan view of the pressure sensor taken along the cutting plane A-A in FIG. 1, wherein the sectional view of FIG. 1 is taken along the cutting plane B-B in FIG. 2.

For damping pulse-like overloads, the pressure sensor 1 of the invention includes a first throttle apparatus, which includes a first damping layer 9 of porous silicon, and a first cover plate 11, wherein the first damping layer surrounds the first opening 5 to the first pressure chamber. Furthermore, the pressure sensor 1 of the invention includes a second throttle apparatus, which includes a second damping layer 10 of porous silicon, and a second cover plate 12, wherein the second damping layer surrounds the second opening 6 to the second pressure chamber. In the case of this arrangement, the hydraulic paths extend to the pressure chambers through the respective damping layers, wherein pulse-like pressure spikes are sufficiently damped through scattering in the porous material, especially silicon.

Figure 5:
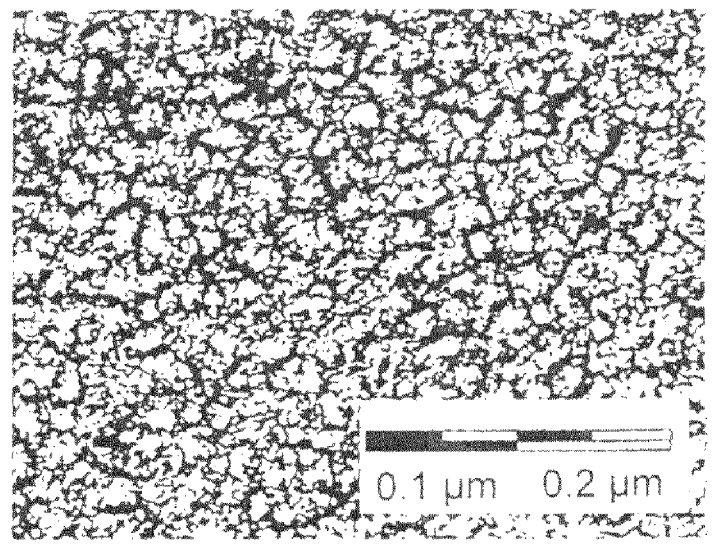
FIGS. 5 and 6 show samples of porous silicon, as it is used in pressure difference sensors of the invention.
Figure 6:
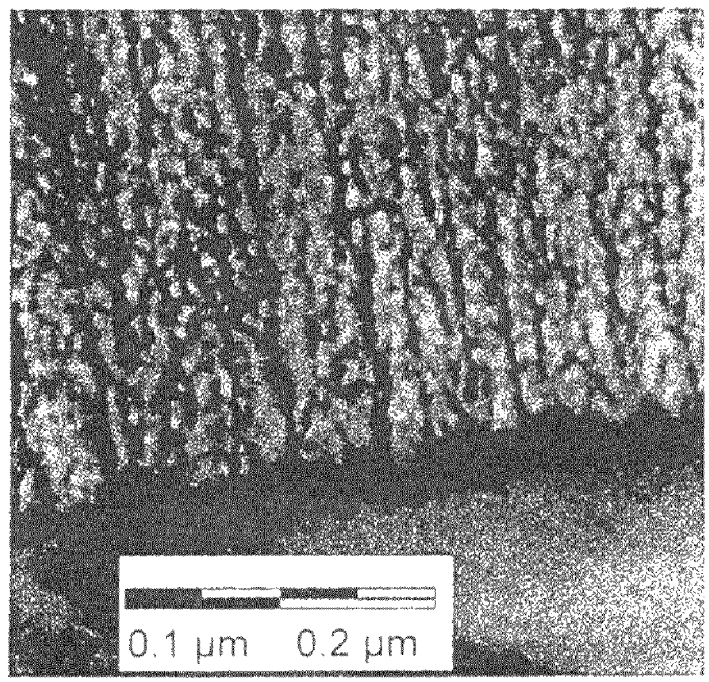

Porous silicon is a form of the chemical element silicon, which possesses an extreme surface/volume ratio (some hundred $m^2/cm^3$). Electrochemical etching (ECE) with HF-ethanol-electrolyte is used, usually, for the manufacture of porous silicon, preferably in the case of smaller electrical current density and high HF concentration. After the etching, a fine interconnected network of submicropores remains. The pores propagate preferentially along the crystallographic <100> direction. Fine control of the etching process enables, with high reproducibility, very good control of the properties of the porous network. Through a change of the electrochemical electrical current, the composition of the electrolyte, or the doping type of the wafer, one can adjust the average diameter of the pores from some nanometers up to a number of micrometers (well controllable size: from 2 to 2000 nm). Additionally, one can also produce a multilayer system of porous silicon with different porosities e.g. by periodic variation of the electrical current density during the etching process. When needed, it is also possible to release the multilayer system from the residual material using a pulsating electrical current. Examples of structures of porous silicon are shown in FIGS. 5 and 6.

For sizing the degree of damping, besides the pore size in the damping layer, in given cases, the size of openings in an, in given cases, provided border strip 17, 18 of the damping layer 9, 10 can be taken into consideration, wherein the cover plates 11, 12, in each case, connect in sealed manner to the border strip. Furthermore, the damping can be reduced through an, in given cases, provided cavity 13, 14 in the center of the damping layer 13, 14, wherein the effective length of the damping distance is reduced by, the cavity.

In forming the cavity, it is to be ensured that the cover plate in the region of the cavity cannot act as a membrane, or diaphragm, via which a pressure pulse can bypass the damping layer and be coupled directly into the pressure chamber. Insofar, a cavity can also have other forms, for example, narrow slits or channels, which extend into the damping layer.

For holding the pressure sensor 1, a first cover body 15 and a second cover body 16 are additionally provided, which are arranged on oppositely lying outer surfaces of the two platform parts 2 and 3, and which surround the particular damping element laterally, wherein the two cover bodies, in each case, have connection surfaces, via which the hydraulic paths of a hydraulic measuring aid can be pressure-tightly connected on the pressure sensor 1, as indicated by the dotted representations of sealing elements.

For protection against static overloads, the first and second platform parts 2, 3 can have membrane, or diaphragm, beds 19, 20, on which the measuring membrane, or diaphragm, in the case of a unilateral overload, can come at least sectionally to rest, and, so, be supported.

The described construction is preferably manufactured essentially completely from silicon, wherein likewise a sandwich construction Si glass-Si glass-Si is possible. The construction occurs at wafer level in a batch process, for example, via SFB (Silicon Fusion Bonding), or eutectically in the case of a pure Si construction, or anodically in the case of Si glass-interfaces. The capillary ducts of the first and second openings, or of further openings and cavities on and through silicon, can be etched, preferably dry chemically (DRIE). Fine, porous silicon is usually wet chemically produced via lithography. The depth of the porous silicon is already sufficient at a few μm up to some 10 s of μm.

Figure 3:
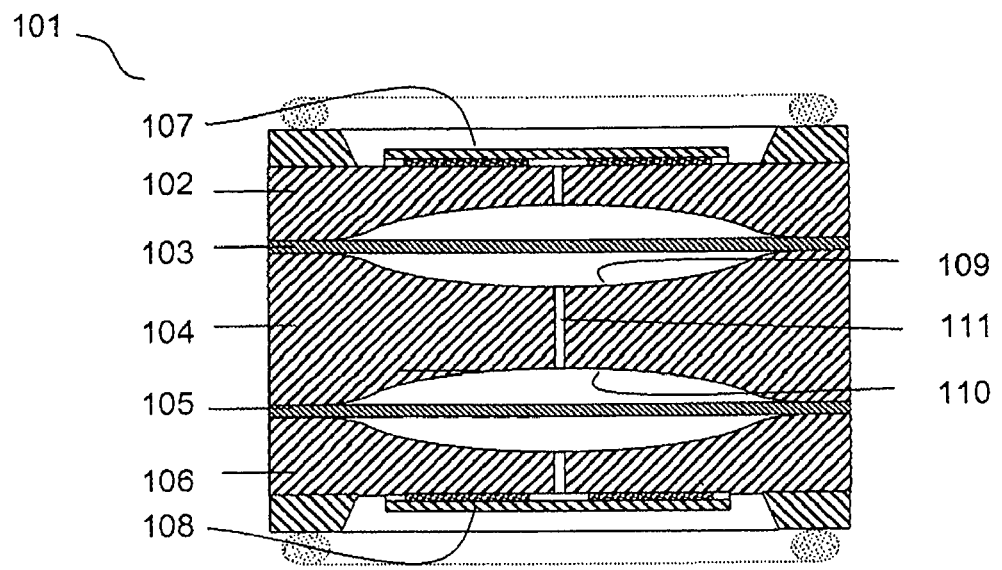
FIG. 3 is a longitudinal section through a second example of an embodiment of a pressure difference sensor of the invention.

FIG. 3 shows a second example of an embodiment of a pressure difference sensor 101 of the invention, which includes a first platform part 102, a first measuring membrane, or diaphragm, 103, a second platform part 104, a second measuring membrane, or diaphragm, 105 and a third platform part 106. The pressure loading of the first measuring membrane, or diaphragm, occurs via a first opening in the first platform part, and the pressure loading of the second measuring membrane, or diaphragm, occurs via a second opening in the third platform part, wherein the first and the second openings communicate, in each case, via a first damping element 107, and a second damping element 108, respectively, with first and second hydraulic paths for pressure introduction. As regards the details of the damping elements and their dimensioning and covering, the explanations for the first example of an embodiment hold correspondingly.

In the second platform part 104, in each case, cavities are provided in the ends of the second platform part 104 facing the measuring membranes, or diaphragms, which together form a central pressure chamber with a first chamber portion 109 and a second chamber portion 110, wherein the chamber portions are hydraulically coupled by means of a central opening 111 through the second platform part 104, and wherein the two chamber portions 109, 110 are sealed outwardly, in each case, by a measuring membrane, or diaphragm, 103, 105.

The walls of the chamber portions 109, 110 can serve for support of the measuring membranes, or diaphragms, in the case of static overloads, as described earlier in the case of the first example of an embodiment.

The central pressure chamber is filled via a channel, not illustrated in detail here, with a hydraulic liquid, in order to couple the two measuring membranes, or diaphragms 103, 105. For electrical registering of the deflection of the measuring membranes, or diaphragms, a transducer is provided on at least one measuring membrane, or diaphragm, preferably, in each case, on both measuring membranes, or diaphragms, as was discussed in connection with the first example of an embodiment.

Figure 4:
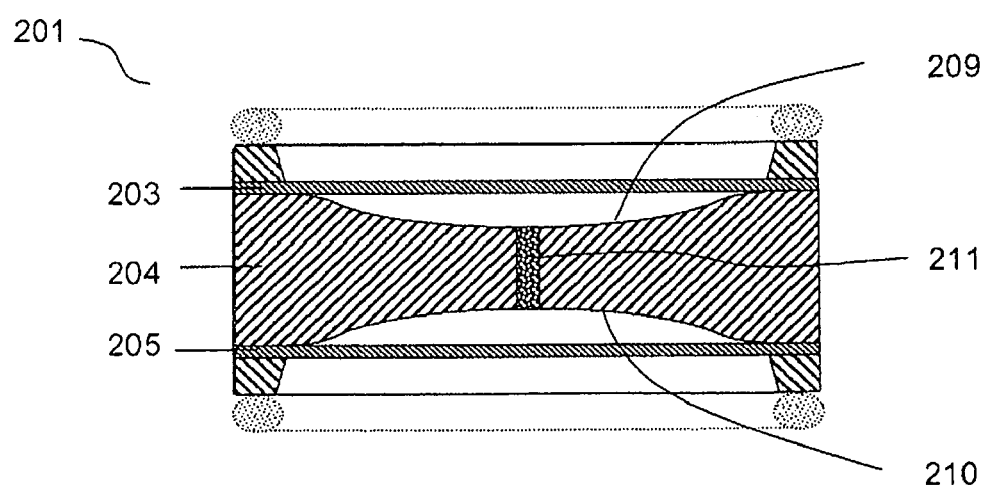
FIG. 4 is a longitudinal section through a third example of an embodiment of a pressure difference sensor of the invention.

FIG. 4 shows a third example of a pressure difference sensor 201 of the invention, wherein the pressure difference sensor includes a first measuring membrane, or diaphragm, 203, a platform 204 and a second measuring membrane, or diaphragm, 205. The pressure loading of the first measuring membrane, or diaphragm, occurs via a first hydraulic path, and the pressure loading of the second measuring membrane, or diaphragm, occurs via a second hydraulic path.

In the platform 204, cavities are provided in the ends facing the measuring membranes, or diaphragms, which together form a central pressure chamber having a first chamber portion 209 and a second chamber portion 210, wherein the chamber portions are hydraulically coupled by means of a central opening 211 through the platform 204, and wherein the two chamber portions 209, 210 are sealed outwardly, in each case, by a measuring membrane, or diaphragm, 203, 205.

The central opening 211 has porous silicon for damping dynamic overloads.

The walls of the chamber portions 209, 210 can serve, as described earlier in the case of the first example of an embodiment, to support the measuring membranes, or diaphragms, in the case of static overloads.

The central pressure chamber is filled via a channel, not illustrated in detail here, with a hydraulic liquid, in order to couple the two measuring membranes, or diaphragms, 203, 205. For electrical registering of the deflection of the measuring membranes, or diaphragms, a transducer is provided on at least one measuring membrane, or diaphragm, preferably on both measuring membranes, or diaphragms, as was discussed in connection with the first example of an embodiment.

The invention claimed is:

1. A pressure difference measuring cell for registering pressure difference between a first pressure and a second pressure, comprising:
    an elastic measuring arrangement having at least one measuring membrane, or diaphragm, comprising silicon;
    a platform pressure-tightly connected with said elastic measuring arrangement;
    a first hydraulic path for transferring a first pressure onto a first surface section of said elastic measuring arrangement;
    a second hydraulic path for transferring a second pressure onto a second surface section of said elastic measuring arrangement, and;
    at least one hydraulic throttle wherein:
    the first pressure opposes the second pressure;
    the elastic deflection of said measuring arrangement is a measure for the difference between the first and the second pressure;
    said at least one hydraulic throttle comprises porous silicon;
    said elastic measuring arrangement has a measuring membrane, or diaphragm, which is arranged between a first platform part and a second platform part of said platform, and is pressure-tightly connected with both said platform parts, in each case, along a perimetral joint;
    said first and said second hydraulic paths comprise, in each case, at least one duct through one of said platform parts; and
    said at least one hydraulic throttle includes a porous Si layer, which surrounds a duct opening on a surface of one of said platform parts facing away from said measuring membrane, or diaphragm, and a hydraulically sealed cover layer, which covers said porous Si layer up to at least one intake opening, which is laterally spaced from said duct opening, so that one of said hydraulic paths extends from at least one intake opening through said porous Si layer in the plane of said porous Si layer to the duct opening.

2. The pressure difference measuring cell as claimed in claim 1, wherein:
    said first platform part and said second platform part have, in each case, on their surfaces facing away from said measuring membrane, or diaphragm, a hydraulic throttle having a porous Si layer and a cover layer, which, in each case, surrounds a duct opening.

3. The pressure difference measuring cell as claimed in claim 1, wherein:
    said at least one duct through the platform has porous silicon.

4. The pressure difference measuring cell as claimed in claim 1, wherein:
    said elastic measuring arrangement has a first measuring membrane, or diaphragm, and a second measuring membrane, or diaphragm;
    said first measuring membrane, or diaphragm, is pressure-tightly secured on a first surface section of said platform along a perimetral joint;
    said second measuring membrane, or diaphragm, is pressure-tightly secured on a second surface section of said platform along a perimetral joint;
    a third hydraulic path extends between said first and the second measuring membranes, or diaphragms, in order to couple said first and the second measuring membranes, or diaphragms, hydraulically; and
    a hydraulic throttle is arranged in said third hydraulic path.

5. The pressure difference measuring cell as claimed in claim 4, wherein:
said hydraulic throttle includes a layer of porous silicon, and said third hydraulic path extends through the porous Si layer of the plane of the Si layer.

6. The pressure difference measuring cell as claimed in claim 1, wherein:
said porous Si layer has a thickness of no more than 20 micrometers, preferably no more than 10 micrometers.

7. The pressure difference measuring cell as claimed in claim 1, wherein:
said porous Si layer has a thickness of not less than 2 micrometers, preferably not less than 4 micrometers.

8. The pressure difference measuring cell as claimed in claim 1, wherein:
pore size of the porous silicon amounts to no more than 100 nanometers, preferably no more than 50 nanometers.

9. The pressure difference measuring cell as claimed in claim 1, wherein:
said pore size amounts to not less than 10 nanometers, preferably not less than 20 nanometers.

10. The pressure difference measuring cell as claimed in claim 1, wherein:
said platform comprises silicon or glass.

11. The pressure difference measuring cell as claimed in claim 1, wherein:
at least one measuring membrane, or diaphragm, comes at least sectionally to rest on said platform in the case of a unilateral overload, and is supported by this.

* * * * *